United States Patent [19]

Miller

[11] Patent Number: 4,678,360

[45] Date of Patent: Jul. 7, 1987

[54] QUICK CONNECT/DISCONNECT ELEMENT FOR LINES

[76] Inventor: James R. Miller, 4910-23rd Ave., W., Everett, Wash. 98203

[21] Appl. No.: 891,243

[22] Filed: Jul. 29, 1986

[51] Int. Cl.[4] ............................................. B25G 3/00
[52] U.S. Cl. ..................................... 403/353; 403/78; 24/128
[58] Field of Search ......................... 403/353, 78, 165; 24/116 A, 128 R

[56] References Cited

U.S. PATENT DOCUMENTS

| | | | |
|---|---|---|---|
| 1,225,100 | 5/1917 | Aubrey | 403/78 X |
| 1,466,495 | 3/1922 | Watson . | |
| 1,887,066 | 11/1932 | Patchen | 24/116 A |
| 2,036,172 | 3/1936 | Gagnon | 24/116 A |
| 2,105,689 | 1/1938 | Freddino | 24/116 A |
| 2,518,276 | 9/1947 | Brawand . | |
| 3,717,907 | 2/1973 | Klein . | |
| 3,857,645 | 12/1974 | Klein . | |
| 4,195,798 | 4/1980 | Costantino et al. | 403/165 X |

FOREIGN PATENT DOCUMENTS 321964  6/1920  Fed. Rep. of Germany ...... 403/290

Primary Examiner—Andrew V. Kundrat
Attorney, Agent, or Firm—Graybeal, Jensen & Puntigam

[57] ABSTRACT

A connector element (10) adapted to receive one line (15) at one end (12) thereof and another line (17) at the opposing end (14) thereof. The one line (15) is permanently secured in the connector (10) at the one end (12). The connector (10) includes a slot (32) in its side, the slot (32) extending from the opposing end (14) to an elliptical opening (33), which is larger than the width of the slot (32). Both the slot (32) and the opening (33) open onto the hollow interior of the connector (10). A retainer element (37) is connected to the end of line (17). The hollow interior of the connector (10) is configured to hold the retainer element (37) within the connector (10), while permitting the line (17) to extend out through the end (14) of the connector. The slot (32) is large enough to accommodate the line (17) while the opening (33) is large enough to accommodate the retainer element (37).

8 Claims, 4 Drawing Figures

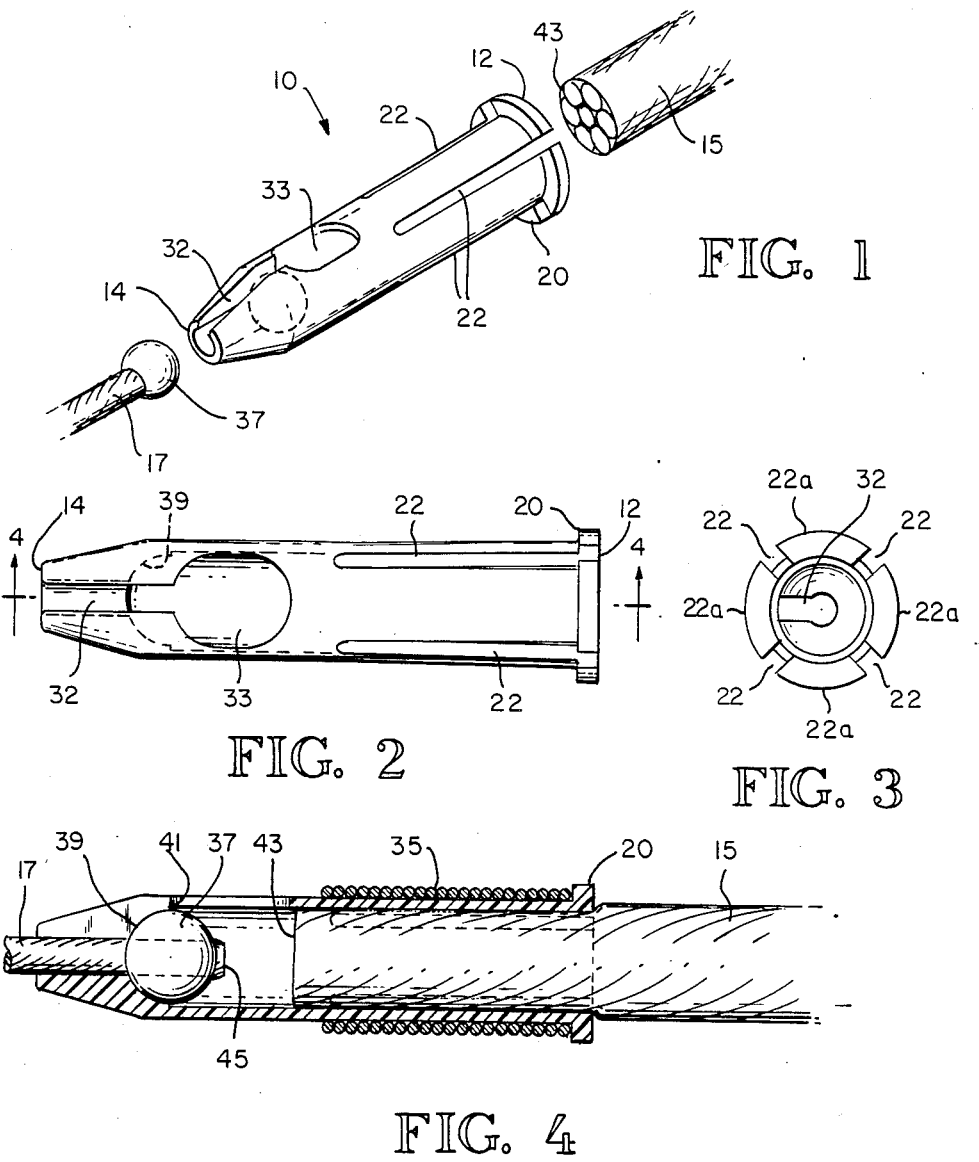

QUICK CONNECT/DISCONNECT ELEMENT FOR LINES

DESCRIPTION

1. Technical Field

This invention relates generally to connectors for lines and more specifically is directed toward a connector element which is permanently secured to the end of one line and is configured to receive the end of another line which has a retainer element fixed thereon in such a manner that the other line can be quickly connected or disconnected from the connector.

2. Background Art

There are many situations where it is desirable to quickly and/or easily connect/disconnect two lines, which may be rope, metal cable, chain, or other material. In many of these situations, a relatively small line, referred to as a lead line, is used with a larger line in some capacity, such as a means for more readily bringing an end of the larger line to a desired location. Known connection means such as physically tying or taping the two lines together may be satisfactory under good conditions but may be difficult or even impossible to use in certain adverse conditions, or may consume an undesirable amount of time.

One specific example of the need for such a connector concerns the lines which are used to "reef" the mainsail on a sailboat. Many sailboats, particularly racing sailboats, have the capability of reefing their mainsails, which simply means to lower the mainsail a defined, relatively small, amount, ususally in 2 or 3 stages. In order to do this, there are reinforced openings (reef cringles) along the leading and trailing edges of the mainsail, as well as intermediate openings across the body of the sail, at three of four levels, as desired.

Thin messenger or lead lines are looped through adjacent reef cringles at the trailing edge of the sail and tied so that there is a short free tail portion for each loop. This free tail portion is available to be tied or secured in some manner to a reef line which runs along or in the boom from the free end thereof to the mast and from there typically to a winch on the deck. When the wind becomes too strong for a fully hoisted sail, the reef line is secured to the tail of the first messenger line and then raised through the first reef cringle by pulling on the messenger line. The reef line is brought down to boom level and secured. Then the halyard for the sail is loosened and the sail is drawn down by the reef line the distance to the first reef openings. The first reef line is then disconnected from the messenger line and the now extra sail is tied to the boom.

A second reef line may be raised through the second reef cringle at the trailing edge of the mainsail by the same process described above using the second messenger line which extends between the first and second reef cringles. If a third reef of the sail is necessary, the first reef line is normally detached from the tail of the first messenger line and secured to the tail of the third messenger line.

In adverse weather, tying the messenger line to the reef lines is difficult and taping of the two lines is virtually impossible. Connecting and disconnecting the two lines becomes quite time consuming, which is a significant disadvantage during a race.

This is only one example where a fast, convenient connect/disconnect capability for two lines is significant. Only examples may be readily conceived by on skilled in the art.

DISCLOSURE OF THE INVENTION

Accordingly, the present invention is an article for connecting two lines, one of which may be substantially larger than the other. The article is a connector element which is configured and arranged such that an end of the one line may be permanently secured to one portion of the connector element. Another portion of the connector element is configured so as to internally capture and/or release a retainer element which is fixed to the other line, wherein the retainer element is larger than the other line.

BRIEF DESCRIPTION OF THE DRAWINGS

FIG. 1 is a perspective representation of the connector element of the present invention, with two lines to be connected shown exploded away from the connector element.

FIG. 2 is a top view of the connector of FIG. 1.

FIG. 3 is an end view of the connector of FIG. 1.

FIG. 4 is a longitudinal cross-sectional view of the connector of FIG. 1, with two lines being shown in a "connect" position.

BEST MODE FOR CARRYING OUT THE INVENTION

Referring now to FIGS. 1, 2 and 3, a connector element is shown generally at 10. The connector 10 in the embodiment shown in somewhat elongated in shape and generally circular in lateral cross section, having two opposing ends, one end 12 for receiving the end of one line, and the other end 14 for receiving the other line.

In the embodiment shown, the line 15 received at the one end 12 is a larger line, and is typically permanently secured in the one end 12 of the connector, as will be described in more detail hereinafter. The other end 14 of the connector is configured to permit the quick insertion and removal of the other line 17, which is typically, but not necessarily, a smaller line than the line 15 secured in the one end 12.

In one embodiment described and shown herein, selected sizes for the two lines 15 and 17 are disclosed, as well as particular dimensions for the connector 10. However, it should be understood that the invention is not limited to particular dimensions, nor particular size of lines. Further, it should be understood that although the connector shown herein is preferably manufactured from a rigid, but pliable, plastic material, by an injection molding process, the connector could be made from other materials, and using other manufacturing techniques.

Referring to the drawings in more detail, the length of the connector 10 in the embodiment shown is 1.75 inches. The exterior surface of the connector includes a front end portion which is conical in shape rearwardly from a blunt front end which is approximately ¼ inch in diameter. The outside diameter of the connector remains constant from the termination of the conical portion to the rear end 12 of the connector, at which point the exterior surface curves outwardly to a diameter of ⅝ inch, forming a narrow rear lip 20.

Connector 10 if hollow, the interior diameter being approximately 7/16 inches from the rear end 12 forwardly for approximately 1⅛ inches. The connector 10 has an outer wall thickness of approximately 1/32 inch over that distance. Longitudinal slots 22—22, spaced 90 degrees apart, are cut in the outer wall of the connector 10. The slots are 1/16 inch wide and extend from the rear end 12 forwardly approximately 15/16 inch.

At the front end 14 of the connector, the interior diameter is approximately ⅛ inch, which remains the same rearward for approximately ⅜ inch, at which point the interior surface curves outwardly at 39 to a point approximately 9/16 inch from the front end 14, where the interior diameter at 41 increases to approximately 7/16 inch. The interior diameter remains the same to the rear end 12 of the connector, as disclosed above.

Extending along the side of the connector 10 is a single slot 32, which extends from the front end 14 rearwardly approximately ½ inch. Slot 32 has a width of ⅛ inch and opens onto the hollow interior of the connector 10. At the rear of slot 32 is a elliptical opening 33, which in the embodiment shown has axes of ⅜ inch and 5/16 inch, and hence is larger than slot 32. The elliptical opening 33 also opens onto the hollow interior of the connector 10.

Referring now specifically to FIG. 4, a free end 43 of the larger line 15 is positioned some distance into the connector 10 at the rear end 12. In the embodiment shown, line 15 extends approximately ⅝ inches into the connector, so that the end of line 15 is near the rear edge of the elliptical opening 33. Small diameter string or twine 35 is used to securely wrap the rear portion of the connector, thereby applying pressure against the connector, forcing the finger portions 22a of the rear end of the connector, defined by the slots 22, somewhat together against the end of line 15. The string is tied and then glued, which results in a very secure attachment of the connector to the end of line 15.

In the embodiment shown, the other line 17 has a small, hard retainer element 37 affixed to it in the vicinity of one end 45 thereof. In the embodiment shown, element 37 is in the form of a small ball, approximately 5/16 inch in diameter, which is the right size to fit through elliptical opening 33 and into the hollow interior of the connector, but is too large to fit through slot 32 or the portion of the hollow interior at the front end of the connector. Element 37, which may be of a hard plastic, has an opening therethrough to accommodate the end of line 17, and is typically glued to line 17.

In use, the portion of line 17 forward of retainer element 37 is urged through slot 32 along its length, with the retainer element 37 being positioned adjacent elliptical opening 33. The line 17 is then pulled which results in the element 37 being drawn into the interior of the connector 10 through opening 33. Line 17 is then drawn taut, tending to seal element 37 against the curved surface portion 39 of the interior of the connector. The two lines 15 and 17 are now securely connected by the connector 10.

In order to quickly disconnect the two lines, line 17 is simply pulled out of the connector 10, from the front end 14 back to the elliptical opening 33, finally drawing out element 37 through the elliptical opening.

Although the invention described and shown herein has many applications, the solution to the reef line problem outlined above is one specific example. The tail of each messenger line will have a retainer element 37 fixed thereto, while the ends of the respective reef lines will have the connector element 10 secured thereto. The reef lines may be conveniently and quickly connected and disconnected to the messenger lines as required for the first, second and third reefs. Reefing of the mainsail can thus be accomplished quickly and reliably, even under the most adverse weather conditions.

Other possible applications include the use of a relatively heavy leash line for animals (which would have the connector element) combined with a lightweight collar line which remains on the animal (which would include a tail having the retainer element fixed thereto. Another example is for use at dock facilities, where a smaller lead line is more readily thrown a considerable distance, with the lead line being connected to a heavier working line. The receiver of the lead line will then use the lead line to draw the working line in.

Thus any application which requires a connection between two lines, in particular between a light lead line and a heavier working line, is a possible candidate for use of the present invention.

Although a preferred embodiment of the invention has been disclosed herein for illustration, it should be understood that various changes, modifications and substitutions may be incorporated in such embodiment without departing from the spirit of the invention as defined by the claims which follow.

I claim:

1. An article for connecting first and second lines, wherein at least the second line is compressible and has a retainer element which is larger than the diameter of the second line secured thereto in the vicinity of one end thereof, the article comprising:

a connector element having one portion adapted to receive the first line and being configured and arranged such that said first line can be permanently secured in said one portion and having another portion adapted to receive the second line, said another portion including an interior channel which extends into said connector element from one end thereof a distance which is substantially greater than the diameter of the second line and which terminates in an interior cavity, wherein said interior channel has a diameter which is large enough to accommodate the second line but not the retainer element and wherein said interior cavity is large enough to accommodate the retainer element, said connector element further including a slot which communicates said interior channel to the exterior of said connector element and which terminates in an opening which is large enough to admit the retainer element and communicates with said interior cavity, wherein the width of said slot is slightly smaller than the diameter of the second line when it is not compressed but large enough to pass the second line when it is compressed.

2. An article of claim 1, wherein said another portion is at the one end of said connector element and said first portion is at the opposing end thereof.

3. An article of claim 2, wherein said connector element is hollow from the one end to the opposing end.

4. An article of claim 3, including a plurality of spaced longitudinal slots extending from the opposing end toward the one end thereof.

5. An article of claim 4, wherein said spaced slots include four slots, equally spaced around the periphery of said connector element, extending at least one-third of the length of said connector element.

6. An article of claim 3, including a lip at the opposing end of said connector element, wherein said lip has a diameter slightly greater than the remainder of said connector element.

7. An article of claim 1, wherein the one end of said connector element is a conical section.

8. An article of claim 6, wherein the retainer element is in the shape of a ball, and wherein a portion of said interior cavity is configured to mate with the retainer element.

* * * * *